Patented May 17, 1927.

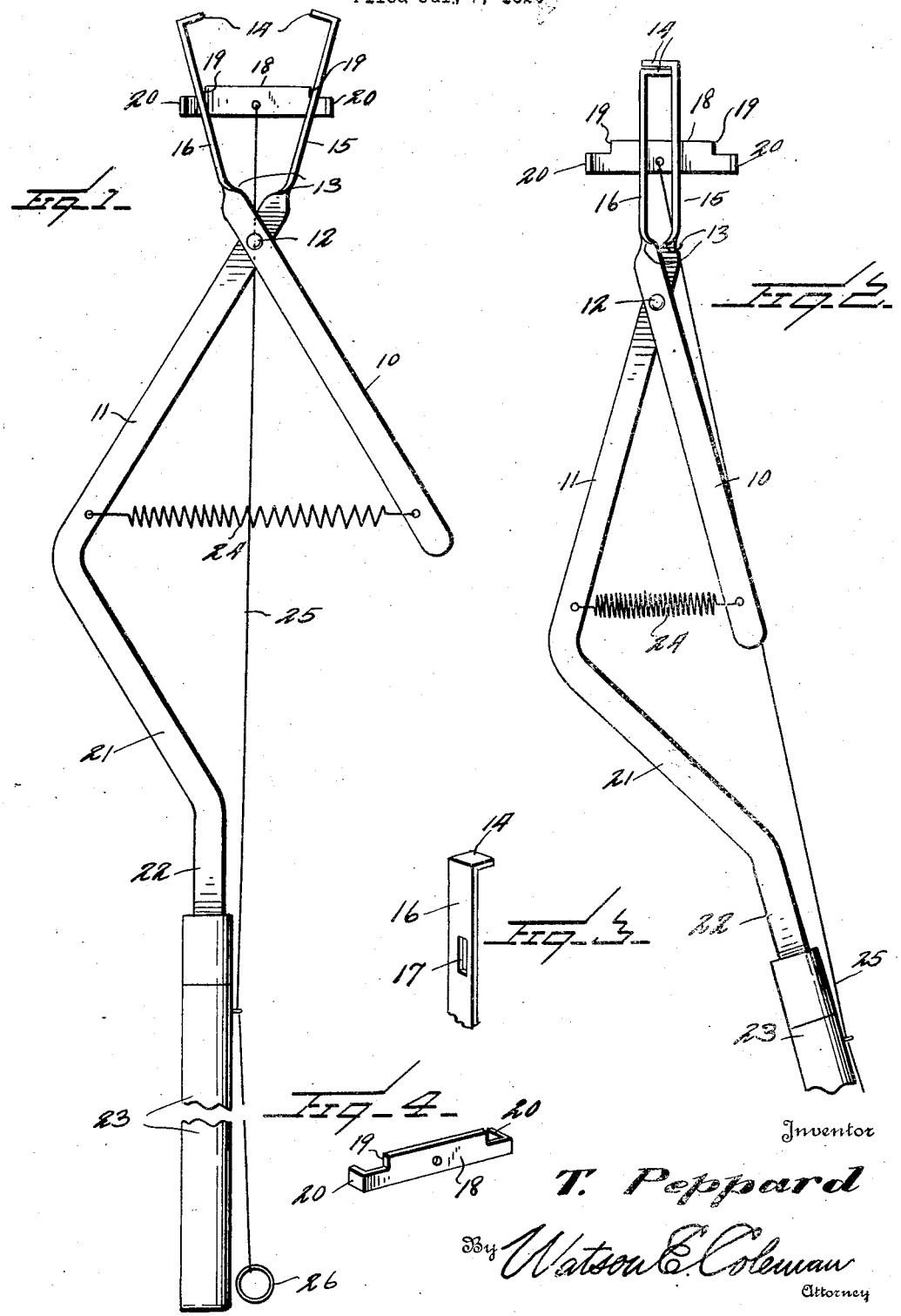

1,629,046

UNITED STATES PATENT OFFICE.

THOMAS PEPPARD, OF OLYMPIA, WASHINGTON.

FOWL CATCHER.

Application filed July 7, 1926. Serial No. 120,985.

This invention relates to devices for catching fowls and the general object of the invention is to provide a device of this character embodying two jaws having crossed shanks and urged to a closed position by a spring, the jaws being normally held apart by a trigger or latch which is dislodged when the trigger or latch strikes the leg of a chicken or other fowl so that the jaws will then close upon the leg of the fowl.

A further object is to provide a device of this character in which the trigger may be dislodged manually.

My invention is illustrated in the accompanying drawings wherein:—

Figure 1 is an elevation of a fowl catching device constructed in accordance with my invention and showing the jaws opened;

Fig. 2 is a like view to Figure 1 but showing the jaws closed;

Fig. 3 is a perspective view of one of the jaws;

Fig. 4 is a perspective view of the latch or trigger.

Referring to these drawings it will be seen that my device comprises two crossed shanks designated 10 and 11. These shanks are pivoted to each other at 12 and each of these shanks is twisted at 13 and then longitudinally extended and at the end inwardly bent as at 14, thus forming two jaws 15 and 16. The jaw 16 is less in length than the jaw 15 so that the flanged end 14 operates inside of the flanged end 14 of the other jaw and limits the closing movement of the jaws. Each of these jaws is slotted as at 17 and disposed through these slots is a bar 18 constituting a trigger, this bar operating loosely in the slots and at the ends being reduced in width to form shoulders 19, the extremities of the bar being inwardly turned or angled as at 20.

The shank 11 extends divergently with relation to the shank 10 and is then extended beyond the shank 10 as at 21, and then is longitudinally extended as at 22 and attached to the handle 23 of any desired length by riveting or otherwise. A coiled spring 24 is connected to the two shanks 10 and 11 and urges these shanks towards each other and thereby urges the jaws to a closed position. Preferably a wire 25 is attached to the trigger 18 and extends down the handle to any desired extent, through guiding eyes if desired, and is provided with a ring 26.

In the use of this device, the jaws are opened against the force of the spring 24 and the trigger bar 18 put in place with the shoulders 19 bearing against the jaws as shown in Figure 1. If now the jaws be forced around the leg of a fowl, the leg will strike the trigger and the jaws will close under the action of the spring 24, thus permitting the fowl to be readily caught. If desired, the trigger may be shifted to its released position by means of the wire 25.

This device is particularly convenient in catching fowls in order to trim their flight feathers or for catching fowls for killing or for any other reason and does away with the necessity of chasing the fowl all over the chicken house or yard. It is obvious that the springs may be readily changed so as to secure greater or less tension and that the trigger bar can be readily modified so as to secure a "hair trigger" effect if desired. My device is simple, can be readily made and has been found most convenient in actual practice.

I claim:—

1. A fowl catcher of the character described comprising a member having a pair of jaws mounted thereon, one jaw being pivotally mounted on the other jaw and elastically urged towards the other jaw, a trigger bar operatively engaging the jaws and holding them open and being bodily longitudinally movable upon the jaws by impact with a fowl, and a flexible member connected to said trigger bar and extending rearward therefrom whereby the trigger bar may be pulled in one direction to release the jaws.

2. A device of the character described comprising a member having a pair of jaws thereon, one jaw being pivotally mounted on the other jaw, the jaws being longitudinally slotted and one jaw being elastically urged towards the other, a trigger bar disposed within said slots and having shoulders adjacent its opposite ends whereby said jaws may be held open when the shoulders are disposed in engagement with the outer end walls of the slots, the trigger bar being longitudinally movable in said slots to permit the closing of the jaws, and a flexible connection extending from said trigger bar and along said member whereby the trigger bar may be manually shifted to release the jaws.

3. A device of the character described comprising crossed shanks pivoted to each other and each provided at one end with a jaw, the extremities of the jaws being inwardly turned and one jaw overlapping the other, said extremities acting as stops preventing the too near approach of the jaws to each other, the jaws being slotted, a trigger bar disposed within said slots and having shoulders adjacent its opposite ends whereby the jaws may be held open, the trigger bar being longitudinally movable in said slots to permit the closing of the jaws, and a spring urging the shanks towards each other.

4. A device of the character described comprising crossed shanks pivoted to each other and each provided at one end with a jaw, the extremities of the jaws being inwardly turned and one jaw overlapping the other, said extremities acting as stops preventing the too near approach of the jaws to each other, the jaws being slotted, a trigger bar disposed within said slots and having shoulders adjacent its opposite ends whereby the jaws may be held open, the trigger bar being longitudinally movable in said slots to permit the closing of the jaws, a spring urging the shanks towards each other, one of said shanks being extended beyond the other shank, and a handle to which the last named shank is attached.

5. A device of the character described comprising crossed shanks pivoted to each other and each provided at one end with a jaw, the extremities of the jaws being inwardly turned and one jaw overlapping the other, said extremities acting as stops preventing the too near approach of the jaws to each other, the jaws being slotted, a trigger bar disposed within said slots and having shoulders adjacent its opposite ends whereby the jaws may be held open, the trigger bar being longitudinally movable in said slots to permit the closing of the jaws, a spring urging the shanks towards each other, one of said shanks being extended beyond the other shank, a handle to which the last named shank is attached, and a flexible connection leading from said handle to the trigger bar.

In testimony whereof I hereunto affix my signature.

THOMAS PEPPARD.